United States Patent [19]

Bacchus

[11] Patent Number: 4,738,305

[45] Date of Patent: Apr. 19, 1988

[54] AIR CONDITIONER AND HEAT DISPENSER

[76] Inventor: Rockney D. Bacchus, 117 Jeweld Mesa St., Santa Teresa, N. Mex. 88008

[21] Appl. No.: 940,185

[22] Filed: Dec. 9, 1986

Related U.S. Application Data

[63] Continuation of Ser. No. 697,742, Feb. 4, 1985, abandoned.

[51] Int. Cl.4 .................... F25B 29/00; F24D 11/00; F24F 7/00; F24J 2/04

[52] U.S. Cl. .................... 165/48.2; 165/18; 165/59; 165/60; 126/428; 126/435; 126/437

[58] Field of Search .................... 165/18, 48.1, 60, 48.2, 165/16, 59; 126/428, 435, 437

[56] References Cited

U.S. PATENT DOCUMENTS 2,110,024 3/1938 Miller .................... 165/60
2,342,689 2/1944 Pennington .
2,464,766 3/1949 Pennington .
2,499,411 3/1950 Pennington .
2,527,569 10/1950 Pennington .
2,536,081 1/1951 Pennington .
2,563,415 8/1951 Pennington .
2,566,366 9/1951 Pennington .
2,576,140 11/1951 Pennington .
2,681,217 6/1954 Pennington et al. .
2,700,537 1/1955 Pennington .
2,723,837 11/1955 Pennington .
2,792,071 5/1957 Pennington .
2,807,258 9/1957 Pennington .
2,818,934 1/1958 Pennington .
2,917,287 12/1959 Tryon .................... 165/18
2,986,379 5/1961 Kramig, Jr. .
2,994,482 8/1961 Valois et al. .
3,125,157 2/1955 Munters et al. .
3,231,409 1/1966 Munters .
3,266,553 8/1966 Munters .
3,368,327 2/1968 Munters et al. .
3,415,502 12/1968 Munters .
3,799,045 3/1974 Sohlberg .
3,802,493 4/1974 Goettl .................... 165/60
3,833,052 9/1974 Cardinal .................... 165/60
4,066,118 1/1978 Goettl .................... 126/435
4,151,721 5/1979 Kumm .................... 165/482
4,153,104 5/1979 Ruder .................... 165/18
4,284,128 8/1981 Nelson .................... 165/48 R
4,339,930 7/1982 Kirts .................... 165/18
4,403,602 9/1983 Warden .................... 126/435
4,505,327 3/1985 Angle et al. .................... 165/60
4,537,035 8/1985 Stiles .................... 165/16

*Primary Examiner*—Albert W. Davis, Jr.
*Assistant Examiner*—John K. Ford
*Attorney, Agent, or Firm*—Bacon & Thomas

[57] ABSTRACT

A heating and cooling air conditioning system includes serially arranged conductive and evaporative pad heat exchangers through which circulating air to be heated or cooled is moved by a blower. The conductive heat exchanger contains a liquid heat exchange medium that is selectively solar heated or cooled by an evaporative heat exchanger, for example, a cooling tower. A single tank reservoir is provided for the heat exchange medium. A singular air valve controls flow of air into the heat exchangers as well as flow of return air to exhaust. A domestic hot water heating tank is disclosed with a heat exchange loop provided in the solar heated heat exchange medium reservoir tank for heating the service hot water supply.

3 Claims, 2 Drawing Sheets

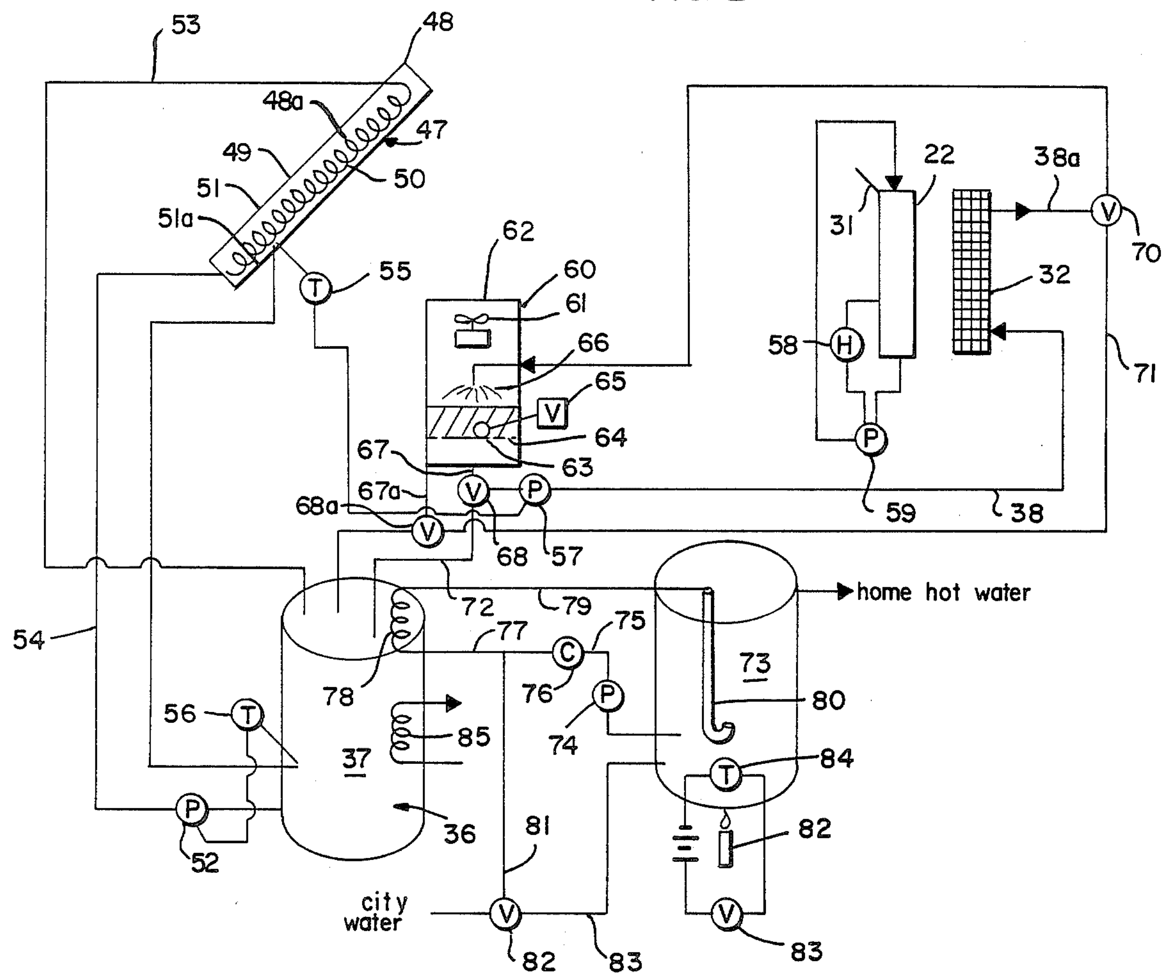
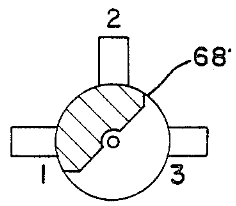
FIG. 3a
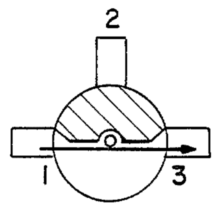
FIG. 3b
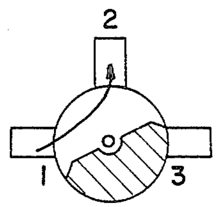
FIG. 3c
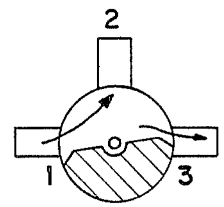
FIG. 3d
| | OPEN | CLOSED |
|---|---|---|
| a) | — | 1,2,3 |
| b) | 1,3 | 2 |
| c) | 1,2 | 3 |
| d) | 1,2,3 | — |
FIG. 3e

AIR CONDITIONER AND HEAT DISPENSER

This application is a continuation of application Ser. No. 697,742, filed Feb. 4, 1985, now abandoned.

BACKGROUND OF THE INVENTION

1. Field of the Invention

This invention relates to a roof-mounted air conditioning system using a conductive heat exchanger and an evaporative pad heat exchanger to selectively heat or cool an enclosure.

2. Description of the Prior Art

The present invention is concerned with an air conditioning system adapted for installation in conjunction with a heat exchanger and an evaporative cooler for heating and cooling buildings for year round operation in geographical areas having low atmospheric humidity, and in particular to a low pressure, high capacity air blower that selectively draws external atmospheric air through a heating or cooling heat exchanger and then through an evaporative cooler for supplying the building's heating and cooling demands. The air conditioning system for the building accordingly is so regulated that both heated and cooled air is supplied in suitable quantities to achieve the desired heating and cooling despite varying environmental conditions.

Prior art systems for heating and cooling interior spaces by using conductive and evaporative heat exchangers mounted in series or parallel are shown, for example, in U.S. Pat. Nos. 2,110,024, 3,802,493, 3,833,052, 4,284,128, and 4,505,327. The aforementioned U.S. Pat. No. 4,505,327 furthermore shows that the use of a solar heater is known to heat a heat exchange medium in a conductive heat exchanger used in an air conditioning system of the same general type corresponding to the present invention.

While the above patents illustrate that the combined effects of conductive and evaporative heat exchangers are known, they fail to illustrate a system wherein a heating and cooling heat exchange medium is circulated through a series of heat exchangers and stored in a single storage tank.

The prior art, moreover, as exemplified by the above-mentioned patents, also fails to provide a conductive heat exchanger through which is circulated a heat exchange medium that may selectively be heated by a solar heater or cooled by a cooling heat exchanger, such as, for example, a cooling tower.

In accordance with the prior art, roof-top evaporative type heat exchangers, even when combined with conductive heat exchangers, are not generally provided with simple air control systems for enabling circulation of ambient and return air in various proportions through the system, or selective exhaust of return air with supply of external ambient air only into the system.

It has also not been generally recognized in the prior art that a simple, fully integrated heating and air conditioning system can utilize solar heating, conductive and evaporative pad heat exchangers, and a cooling heat exchanger whereby circulated air can be heated, cooled, and humidified with a minimum expenditure of energy.

SUMMARY OF THE INVENTION

The present invention comprises a heating and cooling air conditioning system wherein an air duct communicating with a space to be heated or cooled and an intake zone outside such space, includes serially mounted conductive and evaporative pad heat exchangers through which air to be heated or cooled is moved by an appropriate blower. An air directing valve selectively permits circulating air to be returned to an exhaust zone and external ambient air to be admitted to the heat exchangers. The air directing valve may also selectively mix return and ambient air in varying proportions upstream of the heat exchangers.

Heat exchange medium such as water is circulated through the conductive heat exchanger and is selectively heated or cooled by solar energy or a cooling heat exchanger such as a cooling two. Appropriate valves, pumps and controls enable the heat exchange medium to be selectively heated or cooled while it is also circulated through the conductive heat exchanger.

The system is particularly adapted for use in geographic areas where air is relatively dry, so that compressor-condenser coolers are not required.

A single storage tank for the heat exchange medium simplifies the system, such tank being used whether or not the heat exchange medium is heated or cooled.

The system can be operated in conjunction with a domestic hot water heater, wherein a water heat exchange circuit is provided in heat exchange relationship with the storage tank, which in turn is heated by solar energy.

BRIEF DESCRIPTION OF THE DRAWING

FIG. 2 is a partial schematic view of the total heating and cooling system constituting the invention;

FIGS. 3*a–d* schematically illustrate the heat exchange medium control valves used in the system of FIGS. 1 and 2 and their operation.

FIG. 3*e* depicts the condition of the pipes 1–3 in FIGS. 3*a–d*.

DETAILED DESCRIPTION OF THE PREFERRED EMBODIMENT

Figure 1:
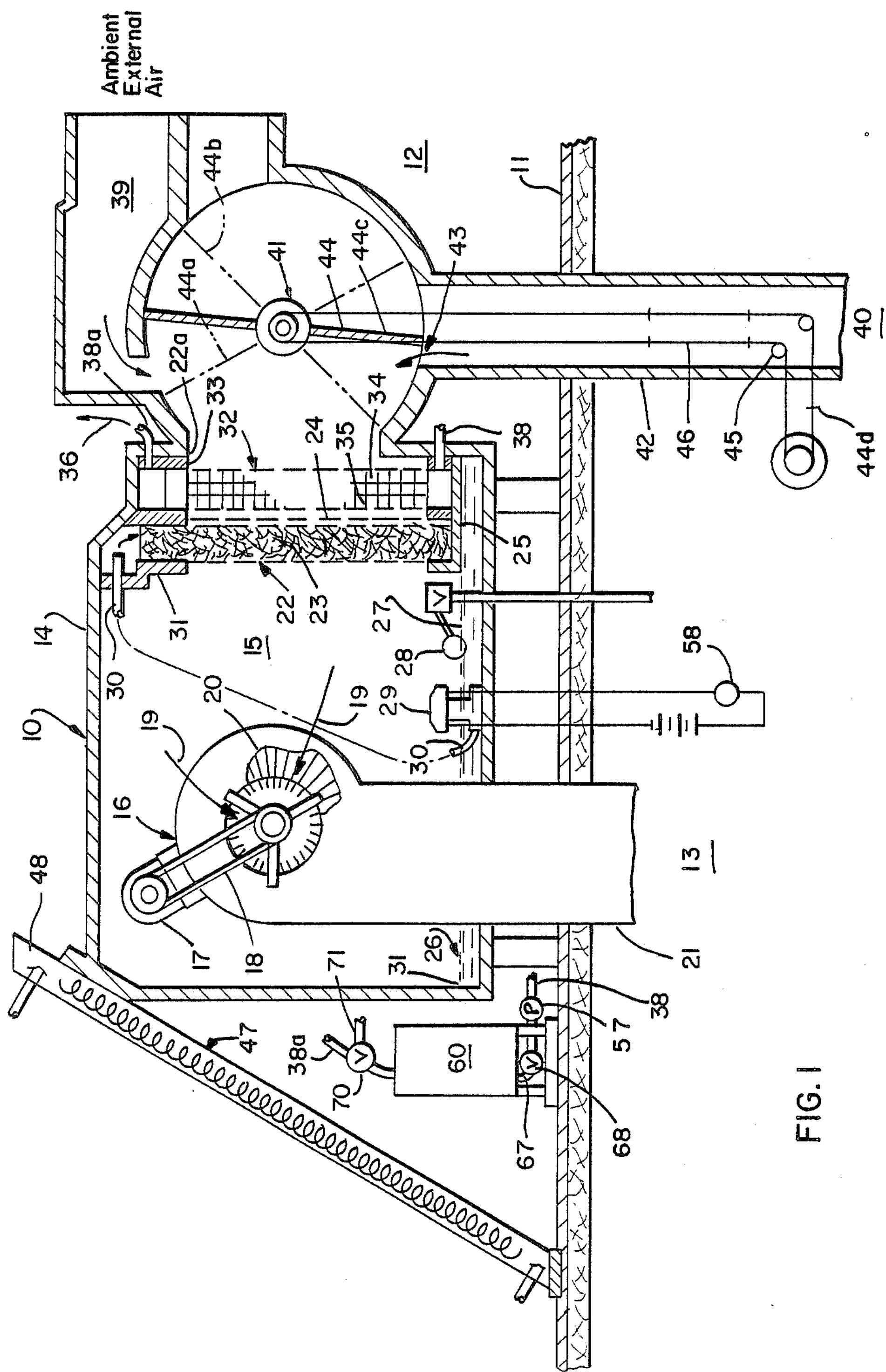
FIG. 1 is a partial cross-sectional representation of the heat exchangers, blower and air control valve constituting the heating end cooling system according to the present invention.

The primary heat exchanger system of the invention, generally 10, is shown in FIG. 1 mounted upon roof 11 of a dwelling or other building having an exterior space 12 and occupant space 13 to be heated or cooled. The system 10 comprises an external housing 14 generally enclosing an inner capture space 15, in which is mounted an air blower 16 powered by an electric motor 17 through a flexible drive belt 18. The blower 16 draws external air, indicated by arrows 19, from the space 15 and thence into blower air inlet 20, and impels it through an outlet duct 21. Blower outlet duct 21 generally directs the air into an occupant space 13.

The system 10 may be used as a conventional evaporative pad air cooling system. In this event, the air 19 is cooled by evaporation upon passing through wetted evaporation pads 22 across the inlet 22*a* to the housing. The pads 22 comprise loosely packed fibers 23, of wood or other water permeable material, retained by wire netting 24. Bottom 25 of housing 14 serves as a reservoir for water 26 admitted from the building water supply and controlled to preselected levels 27 by float control valve 28. The water 26 is impelled by pad water pump 29 through outlet hose 30 to water through 31, by which it is distributed across pad 22 to then flow by gravity downwardly to soak fibers 23. Any excess water 26 flows from the bottom of pad 22 back into the reservoir. The air 19 is thus ordinarily cooled and humidified by evaporative contact with water 26 upon the large surface of fibers 23, before passing into and cooling occupant space 13.

A conductive heat exchanger 32 also is mounted across mounting plates 33 at air inlet 22a so as to direct incoming air 19 through passages 34 between heat exchange fins 35 in conductive relationship. Water 36, or other suitable heat exchange medium, is circulated through passages, not shown, in heat exchanger 32, and the air is either heated or cooled by passage therethrough, depending on the temperature of the water. The water 36 may be stored in a first water tank 37 (FIG. 2) and circulated by water pump 57 through inlet line 38, first heat exchanger 32, and through water outlet line 38a back to tank 37.

A pivotally movable air shutter valve 41 controls the flow of intake, ambient and return air through the system. As shown in FIG. 1, the valve comprises a vane 44 disposed upstream of inlet 33 to housing 14 and upstream of the conductive heat exchanger 32 and evaporator pad heat exchanger 22. The vane 44 may be adjusted to assume positions illustrated in hidden lines at 44a, 44b and 44c. At 44a, the vane 44 permits return air from space 13 to be fully recirculated through the heat exchangers and back to the space 13. At 44b, return air is totally exhausted to an exhaust zone through an appropriate outlet of the valve. At the 44b position, ambient external air is admitted through ambient zone 39 to be drawn by blower 16 through heat exchangers 32 and 22. At the 44c position, return and ambient air are mixed in a specified proportion, while a proportion of the return air is exhausted.

A cable control system including appropriate pulleys and wheels 45 and a guideline 46 may be used to regulate the position of the vane 44.

Duct 42 constitutes the return air duct and opening 43 constitutes the return air duct discharge in the area of valve 41. However, remote electrical sensors and controls may alternately be used, such as those which are commonly used for adjusting t.v. antennas. In the latter case, the various positions indicated in FIG. 1 by reference numbers 44a, 44b, and 44c, can be remotely visualized, but the position of the tabs 44d on the line 46 may alternately be used for this purpose.

A single tank 37 stores heat exchange medium circulated in conductive heat exchanger 32 and the cooling heat exchanger 60, to be described hereinbelow.

Preferably, for heating the water in tank 37 a solar heat exchange system 47 is provided, including a tank 48 alone or in combination with a solar heater 48a, which comprises one or more solar panels 49 mounted on roof 11. As shown in FIG. 2, the solar heater 48a comprises the heat exchanger coil 50, which is exposed to sunlight through a transparent window 51 on the upwardly sloping surface of tank 48, which has a black back surface 51a opposite to the wndow 51, a pump 52, an outlet pipe 53 connected to the coil 50 at the top of tank 48, and an inlet pipe 54 connected at one end to the pump 52 and at the other end to the coil 50 at the bottom of tank 48. Thus, the heat exchange water 36 is heated in the solar heater 48a and this heated water drains into the tank 37, which is advantageously a nonpressurized container so that the water 36 can drain from the solar heater 48a into the tank 37 by gravity when pump 52 is not activated.

Advantageously, the solar heater 48a and the tank 37 are interlocked with thermostats 55 and 56 for controlling pumps 57 and 52, respectively. To this end, when heat is called for in the interior space, and when the thermostat 55 detects that the solar heater 48a is up to a desired temperature, which is preselected by a movable knob on the thermostat 55, the thermostat 55 starts pump 52 to cause water to be circulated through the heating coil 50, whereupon the heated water is returned to the tank 37 at the desired temperature. When the temperature of the water 36 in tank 37 reaches the desired temperature, which is preselected by the dial on the thermostat 56, the thermostat 56 actuates the pump 57 to cause the heated water in tank 37 to be circulated through the conductive heat exchanger 32. This causes the air 19 entering the occupant space 13 to be heated to the desired temperature. Meanwhile, the hydrostat 58, which has an adjustable dial for detecting the humidity in the occupant space 13, controls the pump 59 which feeds water to the top of the evaporation pads 22 via water trough 31 at the top of the pads 22. Thus, the air 19 entering the occupant space 13 through the outlet duct 21 has the desired humidity and temperature when heat exchanger 32 is heating the air.

The system 10 may also be used to cool the occupant space 13 when the water 36 is cooled. Advantageously, this cooler may be a cooling tower 60, as shown in FIG. 2, the means for cooling water 36 is an evaporative cooler such as a cooling tower 60. As is conventional, the cooling tower 60 has a fan 61 for drawing exterior air through opening 62, through the water sprayed into the interior of the cooling tower 60, and out the bottom air exit 63. The water level 64 at the bottom of the cooling tower 60 is controlled by a float valve 65. The water spray 66 is supplied through the outlet pipe 38a of the heat exchanger 32. The air flow through the cooling tower 60 cools the water spray 66 by evaporation. Thereupon, the cooled water excess drains back to the tank 37 through the drain line 67a, which is controlled by a multiple way valve 68a. Ordinarily, the multiple way valve 68 supplies cooled water from the cooling tower to the pump 57. Thereupon, the cooled water is supplied to the bottom of the first heat exchanger 32 through the inlet pipe 38. After existing the heat exchanger 32 the water in pipe 38a returns to the top of the cooling tower 60 in a closed cycle. However, in the event that the cooled water must be stored in some sort of accumulator, the valve 68a is opened to drain the cooling tower 60 through line 67a, which is connected to the top of the nonpressurized tank 37. As will be understood in more detail hereinafter, the valve 68a thus enables the return water to flow from either the cooling tower 60 or the heat exchanger 32.

The multiple position valve 70 is position to direct the water from the top of the heat exchanger 32 into the tank 37 through return line 71 so as to pass water through the valve 68a.

If desired the multiple way valves 68, 68a, 70 and 72 may be positioned to close three connecting pipes, to open two connecting pipes, or to open three connecting pipes, as illustrated in FIGS. 3a-3e. For example, valve 68 may be turned to cause the flow of water 36 from tank 37 through pipe 72, valve 68, pump 57, and line 38 to heat exchanger 32, and from there back to the tank 37 through line 71. Also, the valve 68 may be turned to a position where the cooled water in drain 67 along with water in pipe 72 are pumped through pump 57 into line 38 to provide cooling water for heat exchanger 32.

Ordinarily, however, valve 68 is used primarily for directing water from the cooling tower 60 to the heat exchanger 32 and back to cooling tower 60 in a direct one pass cycle.

When heating is required, the valve 70 is moved to circulate water between the tank 37 and the heat exchanger 32 in a closed loop via line 72, pump 57, and lines 38, 38*a* and 71. Thus, it will be observed that water can be circulated in a closed loop from the heat exchanger 32 to the cooling tower 62 via lines 38, 38*a*, 67 and valve 68 and pump 57. Water can also be circulated between the heat exchanger 32 and the tank 37 via line 72, valve 68, pump 57 and lines 38, 38*a* and 71. In addition, water can be circulated partially from the cooling tower 62 and partially from the tank 37 to the heat exchanger 32 by adjusting multiway valves 68, 68*a* and 70 so that flow is divided between two outlets from a common source. Under these conditions, flow of water to tank 37 can originate both at cooling tower 62 and heat exchanger 32.

In accordance with still another aspect of this invention, the hot water tank 73 supplies hot water for the occupants in occupant space 13. To this end, as shown in FIG. 2, pump 72 is connected via check via 76 and pipe 77 to heat exchange coil 78 in tank 37. The coil 78 is connected to the tank 73 by means of line 79, which empties into tank 73 via an openened pipe 80 inside tank 73. Also, the çity water supply pipe 81 is connected to pipe 77. Thus, the line from tank 73 to tank 37 is pressurized by the city water pressure in line 81. Accordingly, the city water is first heated in coil 78 before it enters tank 73. To this end, the pump 74 needs only to add a small pressure over the city water pressure to accomplish the desired transfer of heat from tank 37 to tank 73. Ordinarily, the water in tank 73 is heated by an energy source 82, such as a flame, which is fueled by gas or liquid fuel through valve 83, in response to the setting on thermostat 84. In accordance with the preferred embodiment of this invention, however, the solar heated water 36 may be used to heat the incoming water for pressurized tank 73.

A separate heating coil 85 may be added to tank 37 for using solar heat to heat a pool or spa water.

In operation the incoming water to tank 73 is heated by the solar heated water in tank 37. Also, the solar heater 48*a* heats water in tank 37 for heat exchanger 32. Alternately, the cooling tower 60, or another suitable heat exchange system and/or cooler, may be used to cool the heat exchange fluid in heat exchanger 32. In addition the air 19 may be humidified by evaporation pads 22 and also cooled thereby.

The water from the cooling tower 60 may be used directly in a closed cycle, as is ordinarily the case, or may be used with cold water from tank 37 or another like tank. To use cold water from tank 37, valve 68 is turned so that water from tank 37 is supplied via pump 57 to heat exchanger 32. When the cold water from the cooling tower 60 is used in a closed cycle, the valve 68 is adjusted so that the pump 57 takes the water from the cooling tower 60 via drain 67 and transmits it through pipe 38 to heat exchanger 32.

When supply of hot water from tank 37 is desired, valve 68 is set to direct water from the tank 37 into line 38 via pump 57, the valve 68 shutting off the water supply from the cooling tower 60 via 67 at this time. The setting of valve 68 then directs the water through the pipe 38 to the heat exchanger 32, and thence back to the tank 37 via valve 70 and pipe 71. Note that the valve 70 may be used to direct all of the water from the heat exchanger back to the tank 37, or back to the solar heater 48*a*. Alternately, the valve 70 can direct water from the heat exchanger 32 to both the solar heater 48*a* and to the tank 37 via pipes 53 and 71, respectively. Pumps 59, 57, 52 and 74 are advantageously positive displacement type pumps. Also, the first heat exchanger 32 is advantageously a heat exchanger of the type used in an automotive radiator. Thus, while the dimensions of the first heat exchanger 32 may be different from an automotive radiator, the principles of the automotive radiator with fins and a passage therethrough are utilized in accordance with this invention.

In the operation of the various valves, the settings of the valves for different scenarios are illustrated in FIGS. 3*a*–3*e*. Thus, for example, the setting in FIG. 3*a* shows that the inlet pipe 1 is disconnected from the outlet pipes 2 and 3. Thus, all three pipes are effectively closed as illustrated in the table of FIG. 3*e*. On the other hand, the setting of FIG. 3*b* shows a straight through arrangement. In this case, the inlet 1 is directly connected to the outlet 3 in a straight line. On the other hand, the arrangement of FIG. 3*c* shows the inlet 1 connected only to the outlet 2 along a curved path at right angles to the straight through path from pipe 1 to pipe 3. Still further, in another arrangement, the inlet pipe 1 may be connected for flow to both the outlet pipes 2 and 3. In this connection, the valve is turned to partially open the two outlet pipes 2 and 3 so that the pressure is divided therebetween from the inlet pipe 1. All of these scenarios are illustrated by the table of FIG. 3*e*.

This invention has the advantage of providing solar domestic heating, solar domestic hot water, humidity control, and air conditioning, which includes cooling with controlled humidification, in year round operation.

The solar loop has the advantage of transferring water from the storage tank to the collector by means of a water pump, which is controlled by a differential thermostat so that the thermostat turns on the pump whenever the thermostat's sensors indicate that both the temperature of the panel is high enough to add heat to the water tank, and the temperature in the tank is not already have a preset level. Also, the pump draws from the bottom of the tank and does not have a check valve, which allows water to flow back through the pump to drain water back down from the collectors to the tank when the pump shuts off. Also, the return line from the collectors returns to the top of the storage tank above the water level, which has the advantage of an air space in the top to allow for complete drainage of the collectors and to allow for thermal expansion.

The domestic hot water service loop has the advantage of transferring water from the bottom of the existing service hot water heater through a heat exchanger in the solar heated water storage tank and back to the cold water inlet side of the service hot water heater. The circulating pump also has the advantage of experiencing very little head pressure, since the line is pressurized by city water pressure. The pump for this system is also controlled by a differential thermostat, so that the thermostat turns on the pump whenever the thermostat's sensors indicate that the temperature in the non-pressurized water storage tank is high enough to add heat to the pressurized domestic water tank, and the temperature in the domestic (city pressure) hot water tank is not above the customer-selected maximum.

Moreover, this invention has the advantage that all city water flows first through the heat exchanger coil so that it always may be preheated before entering the domestic hot water tank. Additionally, the pump draws the lowest temperature water from the bottom of the existing tank, sends it through the water to water heat exchanger, and returns it to the "cold water inlet" on the tank. This provides an optimum solar heating for domestic hot water use. Still further, the temperature setting on the existing hot water unit is set so that it has the advantage of providing "back-up hot water" when cloudy days do not provide enough solar water. Also, the city water and the non-pressurized water never mix.

During the heating cycle, this invention has the advantage that water is drawn from the upper (hottest) portion of the solar storage tank and sent through the water to air exchanger and returned to a mid-level area in the storage tank. This pump is controlled by a differential thermostat so that the thermostat has the advantage of turning on the pump whenever the thermostat's sensors indicate that both the temperature in the non-pressurized water storage tank is high enough to add heat to the air mass in the home, and the temperature in the home is below the customer's selected "living area" thermostat setting (the pump only running while actively heating living space). Additionally, the blower is activated by the thermostat only when there is enough heat in the water to air heat exchanger for effective heat transfer. Still further, the recirculating pump in the evaporative cooler water pan is controlled by a humidistat set to the customer preference, which has the advantage that the heating cycle gives the solar assist heating and humidification control for increased comfort.

During the cooling cycle, water is taken from the cooling tower pan and sent through the heat exchanger 32, whereupon it is returned to the top of the cooling tower. Once again, the recirculating pump and the evaporative cooler water pan and the fresh air automatic damper are controlled by humidistats set to customer preference and the advantageous embodiments of this invention. This two-stage cooling system (conductive and evaporative pad) obtains substantially lower output temperatures than conventional single-stage evaporative coolers. The first stage, consisting of the cooling tower cooled heat exchanger, precools the air and reduces the air's wet bulb temperature. The air flow then passes through the evaporative pad media, which may be a twelve inch thick media having a very high evaporative efficiency without water carry-over, and thus this advantage produces much colder air than conventional pads. Additionally, the cooling cycle is total and thermostatically controlled to customer preference. Accordingly, this invention has the advantage of producing lower temperature air than conventional evaporative cooling; and it also cycles on and off thermostatically in a way similar to conventional refrigerated air conditioning, but with the lower electrical cost of evaporative cooling.

Various modifications within the knowledge of the person skilled in the art could be made to the invention without departing from the spirit and scope of the same, which are defined in the following claims. For example, while the preferred embodiment uses a cooling tower to provide cooling for the first heat exchanger, it is possible to use another type of cooler at this location in the system, and in this connection, the cooler may be arranged on the roof, on the ground, or in some other location. However, it is preferable to direct exhaust heat from the heat exchanger 47 in heat exchange relationship to recapture waste heat from the cooler 60.

What is claimed is:

1. In a heating and cooling air conditioning system including an air duct system communicating with a space to be heated or cooled and an intake zone outside the space; a blower for circulating air through the air duct from the intake zone to the space, means for selectively directing intake air to the duct from within the space, from outside the space or from both inside and outside the space at once, air permeable conductive and evaporative pad heat exchangers serially disposed in the duct in the path of air circulated therein downstream of the intake air directing means, a fluid heat exchange medium, circulating means for moving the heat exchange medium through the conductive heat exchanger; means for selectively heating or cooling the heat exchange medium; the improvement comprising:

- a single storage tank for the circulated heat exchange medium;
- said means for heating the fluid heat exchange medium comprising a solar heating source;
- said means for cooling the fluid heat exchange medium comprising an evaporative cooling tower heat exchanger;
- said means for circulating the heat exchange medium including means for selectively circulating said heat exchange medium through the storage tank in heat exchange relationship with the solar heating source and the cooling heat exchanger; and means for circulating the heat exchange medium in a closed loop between the cooling heat exchanger and the conductive heat exchanger while bypassing the storage tank;
- said means for circulating the heat exchange medium through the conductive heat exchanger including a pump;
- conduits connecting the storage tank, conductive heat exchanger and cooling heat exchanger, and valve means in said conduits;
- said pump and valve means being selectively operable and controllable to (i) circulate solar heated heat exchange medium from the tank to the conductive heat exchanger and back to the tank in a closed loop; (ii) circulate the heat exchange medium from the cooling heat exchanger to the conductive heat exchanger and back to the cooling heat exchanger in a closed loop; and (iii) circulate the heat exchange medium partially from the cooling heat exchanger and partially from the tank to the conductive heat exchanger and partially from the cooling heat exchanger and partially from the conductive heat exchanger to the tank in a mixed flow condition.

2. The improvement in a heating and cooling air conditioning system as claimed in claim 1, the improvement wherein said valve means includes at least one multiple-way valve arranged to admit flow from a single source to two outlets, said source comprising the cooling heat exchanger and the two outlets communicating with the first heat exchanger through the pump and storage tank, respectively.

3. The improvement in a heating and cooling air conditioning system as claimed in claim 2, said valve means including an additional multiple-way valve arranged to selectively admit flow from either or both the cooling heat exchanger and the conductive heat exchanger to the storage tank.

* * * * *